United States Patent
Abraham

[19]

[11] Patent Number: 5,888,334
[45] Date of Patent: Mar. 30, 1999

[54] METHOD OF INDICATING THE LOCATION AND DEPTH OF AN ANCHOR IN A HOLE IN A SUBSTRATE, AND DRILLING THROUGH FILL MATERIAL TO THE ANCHOR

[76] Inventor: Frederic C. Abraham, 21 W. Parkway, Pequannock, N.J. 07440

[21] Appl. No.: 742,573

[22] Filed: Oct. 28, 1996

Related U.S. Application Data

[63] Continuation-in-part of Ser. No. 231,255, Apr. 22, 1994, Pat. No. 5,569,007.

[51] Int. Cl.⁶ .................................................... F16B 39/02
[52] U.S. Cl. ............................. 156/293; 52/707; 411/82; 405/259.5
[58] Field of Search .................................. 156/293, 423; 411/82; 52/707, 706, 745.21; 405/259.5, 259.6

[56] References Cited

U.S. PATENT DOCUMENTS

| | | | |
|---|---|---|---|
| 3,339,609 | 9/1967 | Cushman | 411/82 |
| 4,263,832 | 4/1981 | Lang | 411/82 |
| 4,618,291 | 10/1986 | Wright | 411/82 |
| 4,652,193 | 3/1987 | Hibbs | 52/707 |
| 4,763,396 | 8/1988 | Fischer | 411/82 |
| 5,104,266 | 4/1992 | Daryoush | 411/82 |
| 5,161,916 | 11/1992 | White | 405/259.6 |
| 5,240,543 | 8/1993 | Fetterhoff | 156/293 |
| 5,328,300 | 7/1994 | Fischer | 52/704 |
| 5,490,365 | 2/1996 | Roth | 52/707 |
| 5,562,377 | 10/1996 | Giannuzzi | 52/704 |

*Primary Examiner*—Daniel Stemmer
*Attorney, Agent, or Firm*—Gerald Linden

[57] ABSTRACT

A fixture (structural element) is readily mounted to a surface of a substrate (such as concrete) by embedding and adhering an internally-threaded anchoring element (sleeve) in a hole in the substrate. Preferably, the anchoring element is recessed below the surface of the substrate ("embedded"). To aid in inserting the anchoring element into the hole, an insertion tool may be employed. The system is re-usable, in the sense that the fixture can be removed and replaced, or the fixture can be removed and the hole in the substrate covered. In the latter case, a gauge element may be inserted into the anchoring element prior to sealing over the hole. A template is provided to ascertain the depth that the anchoring element is embedded within the substrate, as determined by the cross-sectional dimension of the gauge element at the surface of the substrate. Alternatively, the insertion tool can remain in place, within a bore in a substrate, mated to the anchor element. A wedge-element is also described for fitting to the end of a threaded rod, for forming an anchor stud. A wedge-element is also described for fitting to the end of an internally-threaded anchor element.

10 Claims, 6 Drawing Sheets

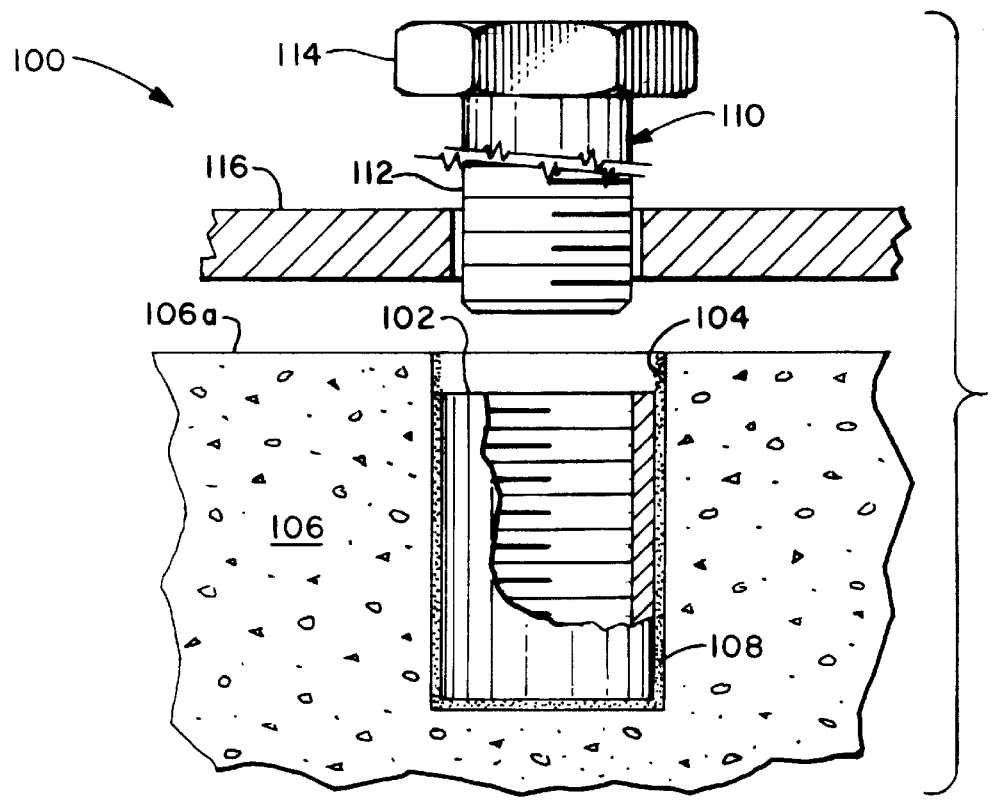
FIG. 1
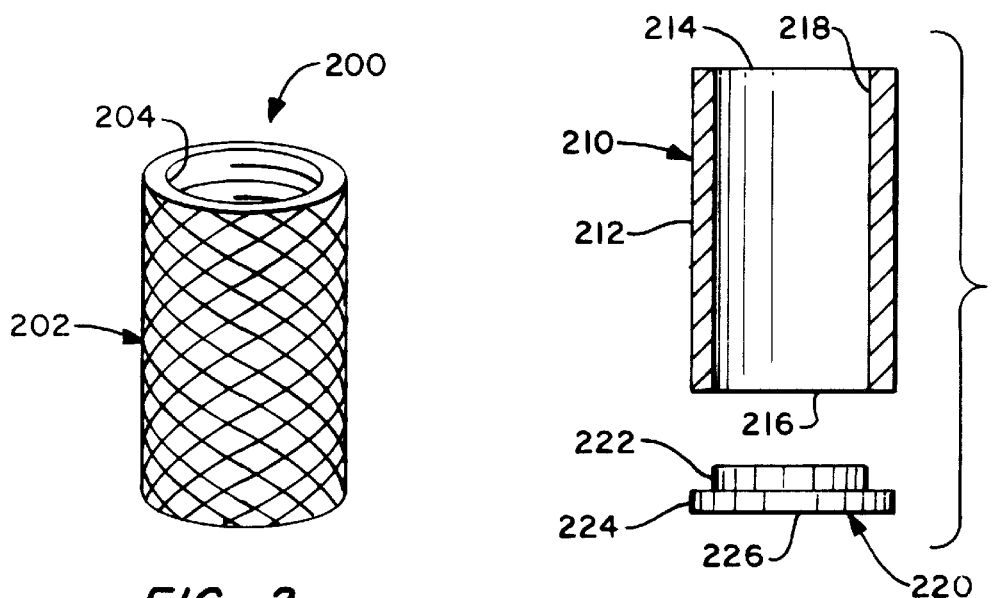
FIG. 2
FIG. 2A

METHOD OF INDICATING THE LOCATION AND DEPTH OF AN ANCHOR IN A HOLE IN A SUBSTRATE, AND DRILLING THROUGH FILL MATERIAL TO THE ANCHOR

CROSS-REFERENCE TO RELATED APPLICATIONS

This is a continuation-in-part of commonly-owned, U.S. patent application Ser. No. 08/231,255 ("parent case") filed Apr. 22, 1994 (status: issued as U.S. Pat. No. 5,569,007, Oct. 29, 1996). A restriction requirement issued in the parent case. This application also functions as a division of the aforementioned parent case.

TECHNICAL FIELD OF THE INVENTION

The invention relates to securing (fastening, anchoring) a structural member (fixture), such as a piece of angle iron, to a surface of a substrate, such as to a concrete slab.

BACKGROUND OF THE INVENTION

Numerous systems are known for securing a structural member to a substrate. For example, U.S. Pat. No. 4,946,325, incorporated by reference herein, describes a "mechanical" anchor stud having an expansion anchor element for gripping the sidewalls (bore) of a hole in a surface (substrate). As is typical of mechanical anchors, the anchor element exerts a sizeable outward radial force on the sidewalls of the hole.

In certain instances, mechanical-type anchors are disadvantageous. For example, in securing a balustrade (structural member) to a narrow strip of concrete (substrate), the outward radial force exerted by the anchor element may cause fracturing of the concrete.

"Chemical" anchoring systems are also known. A typical chemical anchoring system requires that a hole be drilled in a substrate, a quantity of adhesive (such as epoxy) be disposed in the hole, and an externally-threaded stud be inserted into the hole. The adhesive is typically contained in a capsule, which is shattered by insertion of the stud. The stud may also have a chisel point for aiding in mixing a two-part adhesive. The adhesive, upon curing, firmly retains the externally-threaded stud in the hole, and a structural member can be secured (e.g., with a nut) to a portion of the stud that extends (protrudes) beyond the surface of the substrate.

In certain instances, it may not be desirable to use an anchor stud at all, whether it be of the mechanical or chemical type, simply because it is non-aesthetic to have a stud projecting out of a surface. For example, it may be desirable to employ a decorative bolt (i.e., rather than a nut on a stud) to mount the structural member to the substrate. Additionally, it may not be desirable to secure a structural member to a substrate with an anchor stud because, upon removal of the structural member, the stud would remain protruding from the surface. If a flat surface is desired, the protruding portion of the stud, to which a nut would thread onto, must be cut off. Later, if it is desired to remount the structural member, the embedded portion of the stud must be completely drilled out, and a new anchor stud installed in the substrate.

DISCLOSURE OF THE INVENTION

It is therefore an object of the present invention to provide an improved anchoring technique.

It is another object of the present invention to provide a technique for enabling a user to mount a structural member to a substrate, without requiring an externally-threaded stud to project from the surface of the substrate.

It is another object of the present invention to provide a technique for allowing dismounting, and subsequent re-mounting of a structural member to a substrate.

It is a further object of the present invention to provide an anchoring technique which employs a "female" anchor set at any desired depth in (below the surface of) a substrate.

According to the invention, a fixture (structural element) is readily mounted to a surface of a substrate (such as concrete) by embedding and adhering an internally-threaded anchoring element (sleeve) in a hole in the substrate. The anchoring element is essentially a sleeve that has an internally threaded bore receiving an end of a bolt disposed through a fixture mounted to the substrate. Various embodiments of an anchoring element are described.

Preferably, the anchoring element is recessed below the surface of the substrate ("embedded"). To aid in inserting the anchoring element into the hole, an insertion tool may be employed. The insertion tool is essentially a rod or tube, one end of which engages an end of the anchoring element. Various embodiments of the insertion tool are described.

The system is re-usable, in the sense that the fixture can be removed and replaced, or the fixture can be removed and the hole in the substrate covered. In the latter case, a gauge element may be inserted into the anchoring element prior to sealing over the hole. The gauge element may be cut off at the surface of the substrate. The gauge element may be tapered, and may be provided with a thumb-screw type end for user-friendliness. Generally, the hole in the substrate is grouted after the gauge element is disposed into the hole and fitted to the anchoring element. Various embodiments of a gauge element are described.

A template is provided to ascertain the depth that the anchoring element is embedded within the substrate, as determined by the cross-sectional dimension of the gauge element at the surface of the substrate. This is especially pertinent to tapered gauge elements.

In a kit, all of the above elements would be provided, along with a suitable adhesive for securing the anchoring element within the hole in the substrate. Generally, a bolt is not provided with the kit. Rather, it is generally left to the user's discretion to select the type of bolt required (desired) for the particular application.

Among the numerous advantages of the anchoring system and techniques of the present invention is that the internally-threaded sleeve can be set at any depth below the surface of the substrate. Generally, the deeper a given anchor element (e.g., internally-threaded sleeve) is set into a substrate, the more resistant to pullout it will be.

Certain embodiments of the present invention also tend to be self-centering. In other words, since a hole drilled in a concrete (e.g.) substrate tends to be oversized, it is advantageous to incorporate means in the anchor for centering the anchor element within the hole.

Another significant advantage of the anchoring system of the present invention is that the fixture may be dismounted from the substrate, and a depth gauge element inserted into the hole in the substrate prior to filling the hole. The depth gauge provides not only an indication of the location of the "buried" anchor, but also an indication of the embedded depth of the anchor. This is important when re-mounting a fixture (and re-using the embedded anchor element). By knowing the embedded depth of the anchor, it is possible to avoid damaging a drill bit when drilling through the patch material filling the hole in the substrate. (Typical drill bits for drilling through the patch material could become damaged if permitted to drill into the embedded anchor element.)

Another advantage of the present invention is that it accommodates chemical anchors having adhesive in a capsule, as well as adhesives that may be delivered (into the hole in the substrate) by other means, such as by a caulk-gun. In this regard, the anchoring system of the present invention tends to be very flexible (i.e., it accommodates a number of adhesive delivery systems).

The parent case (U.S. patent application Ser. No. 08/231, 255 filed Apr. 22, 1994) is directed to an anchoring system, comprising an anchoring element having an outside diameter, a one end, an other end and an internally-threaded bore extending axially at least partially through the anchor element from the one end towards the other end.

A feature of the anchoring system is that the internally-threaded bore extends completely through the anchoring element, resulting in an opening at the other end of the anchoring element; and further comprising means for closing the opening at the other end of the anchoring element.

A feature of the anchoring system is that the means for closing is a plug having a portion fitting into the opening at the other end of the anchor element.

A feature of the anchoring system is that the portion fitting into the opening is threaded.

A feature of the anchoring system is that the means for closing is a plug having a chisel-shaped tip.

A feature of the anchoring system is that thread-locking means are disposed on an intermediate portion of the anchoring element.

A feature of the anchoring system is that an external surface of the anchoring element is provided with ridges.

A feature of the anchoring system is that an external surface of the anchoring element is formed with a non-circular cross-section.

The anchoring system may also include an insertion tool for inserting the anchoring element into a hole in a substrate.

The anchoring system may also include an adhesive for securing the anchor element in a hole in a substrate.

A feature of the anchoring system is that the anchor element has an outside diameter, and the insertion tool has an outside diameter which is no greater than the outside diameter of the anchor element.

A feature of the anchoring system is that the anchor element has an internal thread extending from the one end at least partially towards another end.

A feature of the anchoring system is that the insertion tool includes means for threading into the internal thread of the anchor element.

The anchoring system may include a gauge tool for inserting into the end of the anchoring element.

A feature of the anchoring system is that the gauge tool is tapered.

A feature of the anchoring system is that the gauge tool has a threaded end for threading into the one end of the anchoring element.

The anchoring system may include a template for determining how deep the anchoring element is embedded in a substrate.

The anchoring system may include thread-locking means disposed on an intermediate portion of the anchoring element.

A feature of the anchoring system is that an external surface of the anchoring element is provided with ridges.

A feature of the anchoring system is that an external surface of the anchoring element is formed with a non-circular cross-section.

The anchoring system may include an insertion tool for inserting the anchoring element into a hole in a substrate.

The anchoring system may include an adhesive for securing the anchor element in a hole in a substrate.

A feature of the anchoring system is that the anchor element has an outside diameter, and the insertion tool has an outside diameter which is no greater than the outside diameter of the anchor element.

A feature of the anchoring system is that the anchor element has an internal thread extending from the one end at least partially towards another end.

A feature of the anchoring system is that the insertion tool includes means for threading into the internal thread of the anchor element.

The anchoring system may include a gauge tool for inserting into the end of the anchoring element.

A feature of the anchoring system is that the gauge tool is tapered.

A feature of the anchoring system is that the gauge tool has a threaded end for threading into the one end of the anchoring element.

The anchoring system may include a template for determining how deep the anchoring element is embedded in a substrate.

Appended hereto is a 10 page document entitled LaFemme Chem, the of which is incorporated by reference herein. "La Femme Chem" is a trademark of the applicant for an anchoring system as described in the document, which shall hereinafter be referred to as "LFC".

As noted at page 2 of LFC, an anchor bolt (compare 110) can be threaded into a knurled nut (compare 200).

As noted at pages 2–3 of LFC, "a chisel tip can be screwed into the bottom end [of the knurled nut] for use with chemical capsules . . . " At page 2 of LFC, a chisel tip having a male thread (externally threaded for fitting to an internal thread of an anchor element) is illustrated. Compare the chisel tip 808 which has a female thread (internally threaded for fitting to an external thread of an anchor element). Such a female thread chisel tip is better suited to fitting to the end of a threaded rod, an example of which is illustrated at the bottom right of page 3 of LFC.

Page 6 of LFC illustrates external features of the knurled nut. Compare 200. As illustrated, the top of the anchor (knurled nut) may have an annular recess (lip) so that an insertion tube can snap fit onto the end of the anchor to facilitate installation. This is different than the insertion tools 300 and 404 shown in FIGS. 3A and 4, and is shown in greater detail (without the spring clip) in the illustration at the bottom of page 6 of LFC.

In LFC, the insertion tool has a collet-like end with a spring clip in an annular recess and at least one, preferably two slits extending axially from the end. In this manner, the end of the insertion tool may expand about, and effect a "snap fit" with the mating end of the anchor (knurled nut). As mentioned hereinabove, an useful feature of the insertion tool is its ability to prevent adhesives (e.g., epoxy) from invading the threads of the anchor. And, as mentioned above, the insertion tool permits the anchor to be inserted recessed into a bore of a substrate.

As noted at page 7 of LFC, the insertion tool may be left in place, to perform a function comparable to that of the gauge element (600, 602) described hereinabove.

Other objects, features and advantages of the invention will become apparent in light of the following description thereof.

BRIEF DESCRIPTION OF THE DRAWINGS

FIG. 1 is a cross-sectional view, partially cut-away and partially exploded, of an embodiment of the anchoring system of the present invention.

FIG. 2 is a perspective view of an embodiment of an anchoring element of the present invention.

FIG. 2A is a side-cross sectional view of an embodiment of an anchoring element of the present invention, showing also a plug element.

FIG. 2B is a perspective view of the plug element of FIG. 2a.

FIG. 8 is a front view, partially in cross-section of a wedge element, for fitting to the end of an externally-threaded stud, according to the present invention.

DETAILED DISCLOSURE OF THE INVENTION

Figure 2B:
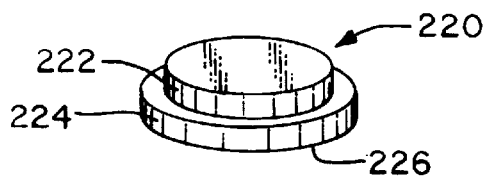

FIG. 1 shows an embodiment of the anchoring system 100 of the present invention. Generally, an anchoring element 102 is embedded within a hole 104 extending into the surface 106a of a substrate 106, and is secured within the hole 104 with a suitable adhesive 108 (shown as dots), such as with epoxy. The adhesive may be inserted into the hole by any suitable means, such as by disposing a capsule of adhesive into the hole prior to inserting the anchor (anchoring) element 102, or by squirting adhesive into the hole such as with a caulk-gun.

The anchoring element 102 is generally a cylindrical sleeve (or barrel), with an internally-threaded bore, and may extend fully to the surface 106a of the substrate, or may be recessed within the substrate 106 (as illustrated), or may project beyond the surface 106a of the substrate. Preferably, the anchoring element 102 is recessed (embedded) within the hole 104, as shown in FIG. 1, so that its top (as viewed) surface is below the surface of the substrate. Generally, the greater the embedded (embedment) of the anchoring element, the greater its pullout resistance will be.

Resisting (vertical) pullout is a desirable feature of the anchoring element 102. Generally, the pullout resistance of the anchoring element 102 is a function of its depth relative to substrate (e.g., concrete) strength, up to the ultimate strength of the fastener (e.g., 110, discussed below).

The substrate 106 is any material, such as concrete, to which it is desired to mount a structural element (fixture) 116 (a representative portion of which is shown in cross-section), such as an angle iron (e.g., for a handrail balustrade). To this end, a fastener (such as a bolt 110) is provided, which is externally-threaded to screw into the internally-threaded hole (bore) of the anchoring element 102. The bolt has an externally-threaded shank 112, and may have a head 114. The head of the bolt is typically larger than the shank, and may be of any suitable form, such as hex-head, slot-head, cross-head, security-head, or of any decorative form (shape, alloy, plating, etc.). The fastener (e.g., 110) may also be a non-headed fastener.

Evidently, when employing an adhesive (e.g., 108), one cannot simply dispose the adhesive into the hole (e.g., 104), and then insert an anchoring element having a bore extending completely therethrough. In other words, it is not desirable to have adhesive on the internal threads of the anchoring element (102), since this would interfere with the threading of the bolt (110) into the anchoring element (102), or may prevent future (subsequent) removal of the fastener (by adhering the bolt threads to the anchoring element threads).

FIG. 2 shows an embodiment of the anchoring element 200 of the present invention. In this case, the anchoring element is a metal (e.g., steel), cylindrical sleeve 202 having an internally-threaded bore 204, and an irregular (e.g., knurled) outer surface (indicated by the crossed lines on the external surface of the sleeve). The bore 204 extends at least partially into the sleeve, and preferably fully through the sleeve, from its top (as viewed) surface to its bottom (as viewed) surface. Exemplary dimensions for the sleeve are 2" (inches) long, with a ⅜" threaded (e.g., 16 tpi) bore, and the sleeve is suitably formed of steel, stainless steel or other threadable material.

Preferably, the bottom of the sleeve is closed, even if the bore 204 extends fully through the sleeve, in order to prevent intrusion of adhesive material (previously disposed into the hole in the substrate) onto the threads of the bore 204.

FIG. 2A shows a sleeve (anchoring element) 210, having an elongated body 212, a front end (top surface) 214, a rear end (bottom surface) 216, and a bore 218 extending completely through the body 2124 from the front end 214 to the rear end 216. The bore 218 is threaded (not shown in this view, for illustrative clarity) by any suitable means. Internal threads may extend fully through the bore, or only partially through the bore (e.g., from the front end towards the rear end).

The bore 214 is closed off, at the rear (bottom) end 216 of the sleeve 210, by a plug element 220. The plug element is sized and shaped to have an interference fit within the bore, and is formed of a suitably resilient material such as rubber of plastic. For example, the plug can be formed as button-like element having a portion 222 with a diameter slightly larger than the diameter of the bore (214), and a larger portion having a diameter approximately to the diameter of the body (212). The diameter of the portion 224 can also be slightly larger than the diameter of the sleeve body 212.

FIG. 2B shows an alternate view of the plug 220. As shown in FIGS. 2A and 2B, the plug 220 has a generally flat bottom surface 226. This is preferred.

Figure 2C:
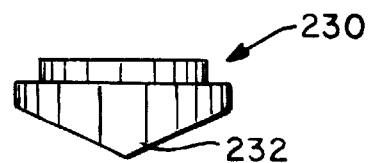
FIG. 2C is a perspective view of an alternate embodiment of the plug element of the present invention.

FIG. 2C shows an alternate embodiment 230 of the plug element (220). In this embodiment, the plug is formed to have a wedge-shaped (chisel-shaped) bottom surface 232. A portion 234 of the plug is similar to the portion 222 of the plug 220, and is intended to be received into the bore of the sleeve.

The end of the plug is of any chisel-shape suitable for fracturing a capsule containing two mixable epoxy elements (adhesive and hardener), and mixing (stirring) the two elements.

The plug can be threaded, to thread into the end of the anchor element. For example, the portion 222 of the plug 220 can be threaded to thread into the bore of the anchor element sleeve (from the rear end), rather than being un-threaded (as shown) to fit within the bore of the anchoring element by an interference, resilient fit.

Rather than using a discrete plug, to close off the rear end of the sleeve, it is also possible to form the sleeve with the front (top) end open and the rear (bottom) end closed, such as pinched off, welded, or the like.

Generally, the adhesive (e.g., 108) will secure the anchoring element in the hole within the substrate, preventing the anchoring element from pulling out, as well as from turning.

Figure 2D:
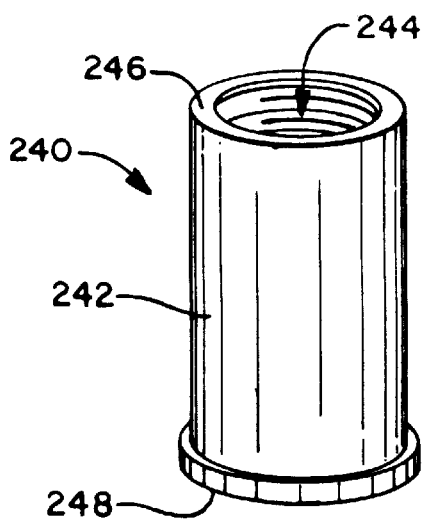
FIG. 2D is a perspective view of an alternate embodiment of the anchor element of the present invention.

FIG. 2D illustrates an embodiment of the anchoring element 240 of the present invention. In this case, the anchoring element 240 has a body portion 242 with an internally-threaded bore 244 extending into the body portion from the front (top) end 246 of the body portion 242. The body portion 242 has a diameter. The rear (bottom) end is formed with a flange 248 having a diameter slightly larger than the diameter of the body portion 242. In this manner, the anchor element 240 will be more difficult to pull out, when secured with adhesive in a hole in a substrate. Generally, however, this configuration is not preferred, since the hole in the substrate would need to be sufficiently large to accommodate the flange, leaving a large gap between the body portion 242 and the sidewalls of the hole in the substrate. If the bore 244 extends completely through the anchor element (including the flange), the back (bottom) end can be plugged with a suitable element, as described hereinabove (e.g., 220).

Given that a hole drilled in a substrate may be oversize, in which case a sleeve having straight (cylindrical) sides would fit sloppily within the hole, the flared portion 248 of the sleeve 240 would accommodate the oversize of the hole, in other words aid in centering the sleeve in the hole. The flared portion 248 may also be segmented, to have spokes (so to speak), so that adhesive below the sleeve could work its way past the flared portion to the outside of the sleeve body, ensuring aggressive adhesion of the sleeve within the hole in the substrate.

Figure 2E:
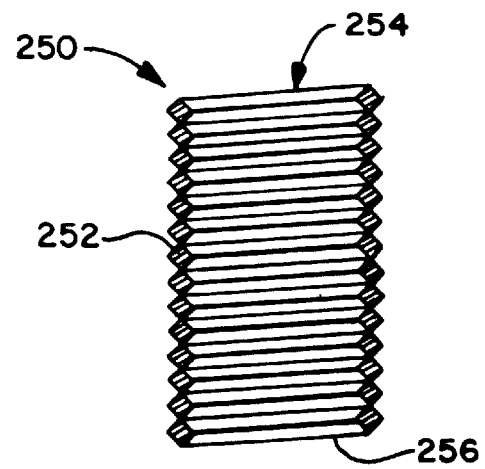
FIG. 2E is a side cross-sectional view of an alternate embodiment of the anchor element of the present invention.

FIG. 2E illustrates an embodiment of the anchor element 250 of the present invention. In a manner analogous to the anchor element 200 of FIG. 2 having a knurled external surface to provide aggressive adhesion (and resistance to pullout) within a hole in a substrate, the anchor element 250 also has an irregular external surface. The body portion 252 of the anchor element is formed from a coil of square wire stock, to have an internally-threaded bore 254 and a very irregular (in this case, threaded) external surface. The back (bottom) end can be plugged with any suitable plug, such as has been discussed hereinabove. Again, the irregular external surface will enhance the pull-out resistance of the anchor element when it is adhered within a hole in a substrate.

Figure 2F:
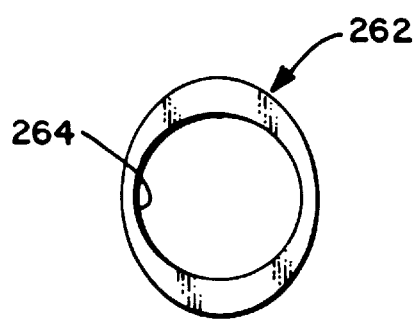
FIG. 2F is an end view of an alternate embodiment of the anchor element of the present invention.

FIG. 2F illustrates an embodiment of the anchor element 260 of the present invention. Here, the body portion 262 is provided with an internally-threaded bore 264, which is generally circular, and the exterior of the body element is shaped to be non-circular (e.g., elliptical, as shown). This, of course, requires a larger hole in the substrate to accommodate the largest transverse dimension of the body portion, and may be disadvantageous for the reasons set forth above with respect to FIG. 2*d*. Nevertheless, it is evident that the non-circular shape of the body portion will enhance the anchor element's resistance to turning, once it is adhered within a hole in a substrate.

As mentioned above, a hole drilled in a substrate may be oversize, in which case a sleeve having straight (cylindrical) sides would fit sloppily within the hole. In this case, it is contemplated that the major axis of the ellipse (elliptical cross-section of the anchoring element 260) would approximate the size of the hole drilled into the substrate. In this manner, the anchoring element may better be centered in the hole. Since the hole would nominally be round, there would be a relatively large gap between the anchoring element and the sidewalls of the hole along the minor axis of the ellipse (i.e., of the elliptical cross-section of the anchoring element), which would accommodate the adhesive.

Generally, the anchor element may be of any base material, composite structure, irregular shape or surface which, which, when the anchor element is embedded in a substrate using an adhesive (grout, epoxy, or the like), provides mechanical resistance to rotation, as well as horizontal and vertical (pullout) forces.

Figure 2G:
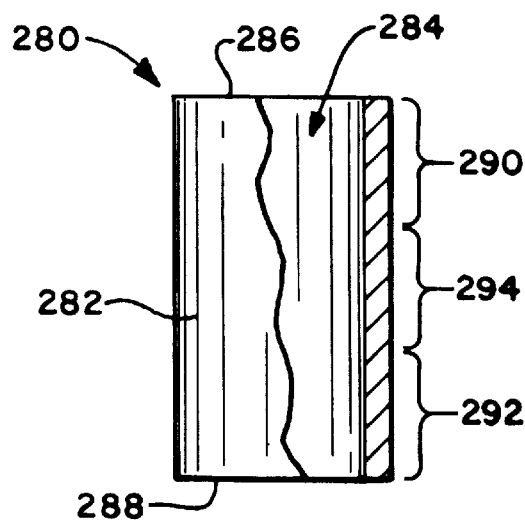
FIG. 2G is a side view, partially broken-away, of an anchor element of the present invention.

FIG. 2G is illustrative of various means for locking a bolt (110) into the anchoring element (e.g., so that the bolt will not tend to unscrew itself). An anchoring element 280 is shown, which may be any of the aforementioned anchoring elements. The anchoring element has a body 282, a threaded bore (threads omitted from this view) 284 extending through the body 282, a front end 286 and a rear end 288. The body 282 has a front portion 290 extending from the front end towards the rear end, a rear portion 292 extending from the rear end towards the front end, and an intermediate portion disposed between the front portion and the rear portion.

In order to "lock" the external threads of a bolt (e.g., 110) into the internal threads of the bore 284, a locking mechanism is disposed at a location or locations on the anchoring element 280. This (these) location(s) is(are) preferably in the intermediate portion 294 and/or in the rear portion 292. The locking mechanism may comprise, for example, a deformation of the threads in the bore 284 (at those locations), a pellet inserted onto the threads in the bore 284 (at those locations), an internal patch inserted onto the threads in the bore 284 (at those locations), an inwardly-extending dimple formed on the body portion 282 (at those locations), and the like.

As will become evident, it is preferably that such a locking mechanism is not disposed at the location of the upper portion 290, and that the threads in that portion 290 remain suitable for easily receiving and releasing an insertion tool (described hereinafter).

Figure 3:
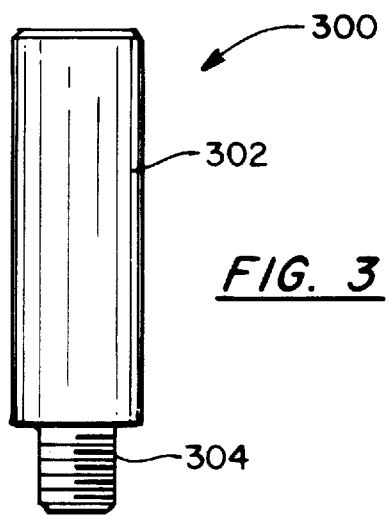
FIG. 3 is a side view of an insertion tool of the present invention.

FIG. 3 shows an insertion tool 300, which is part of the anchoring system of the present invention. The insertion tool 300 has a cylindrical body portion 302 which is no greater in diameter than the outer diameter of the sleeve (anchor) element (e.g., 102, 200, 210, 240, 250, 260). Preferably, the diameter of the body portion is less than the diameter of the anchoring element, and at least as great as the outside diameter of bolt threads (e.g., 110) which will be threaded into the anchoring element.

An end portion 304 of the insertion tool 300 is threaded, so that the end 304 can be threaded into the front (top) end of an anchor element, into the bore thereof (e.g., 214, 244, 254, 264). In this manner, the insertion tool and the anchor element (sleeve) will be coaxial, and the user can easily grasp the insertion tool to insert the anchor element into a hole in a substrate (preferably, after the adhesive has been disposed into the hole), especially when it is intended that the anchor element will be recessed below the surface of the substrate. It is thus evident why a locking element would not be disposed on the top portion of the threads (see, e.g., FIG. 2G).

Furthermore, by threading the insertion tool 300 into the sleeve (anchoring) element (e.g., 200), the front (top) end (e.g., 214, 254, 264) of the bore (e.g., 218, 244, 254, 264) will be closed, to prevent adhesive (e.g., 108) from entering the bore, sticking to the internal threads, and interfering with the subsequent insertion of a bolt (e.g., 110) into the anchor element. This is, to the extent of preventing intrusion of adhesive into the internal threads of the anchor element, similar to the function performed by the plug element (e.g., 220, 230) closing off the back (bottom) end of the anchor element.

In use, the threaded end of the insertion tool is threaded into the front (top) end of the sleeve (anchor element), adhesive is disposed within the hole in the substrate, the sleeve is inserted into the hole (with both of its ends closed off, to prevent adhesive from getting onto the internal threads), the adhesive is allowed to cure, and the insertion tool is withdrawn. In this example, the insertion tool must be fabricated from a material which is releasable from the adhesive—for example, a teflon (tm) coated material (such as metal), or a material (e.g., nylon) which is inherently releasable from the adhesive.

It is also possible that the insertion tool is left remaining in the hole in the surface, rather than being withdrawn from the hole.

The insertion tool is formed of any suitable material, such as plastic (preferably chemically non-reactive with the adhesive), metal, hard rubber, or any semi-rigid or rigid material.

Figure 3A:
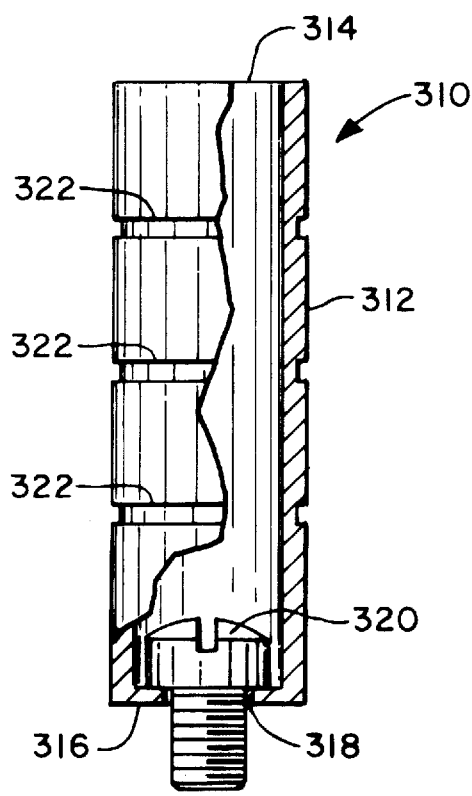
FIG. 3A is a side, partially cutaway view of an alternate embodiment of the insertion tool of the present invention.

FIG. 3A shows an embodiment of the insertion tool 310 of the present invention. In this case, the insertion tool has a hollow (rather than solid), tube-like body portion 312. One end 314 of the body portion is completely open. The opposite end 316 of the body portion is partially closed, but has a hole 318 through which a screw 320 can extend. The screw 320 has a head larger than the hole 318 but smaller than the interior bore of the body portion. The screw 320 has a threaded shank which protrudes through the hole 318, beyond the end 316 of the body portion 312, to thread into the internally-threaded bore of an anchor element (as described hereinabove).

Generally, the insertion tool 310 functions in the same manner as the insertion tool 300. In this case, however, after the anchor element is securely adhered within the hole in the substrate, the screw 318 can be removed with a magnetic screwdriver, or the like, inserted through the bore of the body portion 312 of the insertion tool. It is possible to leave the body portion 312 in place, within the hole in the substrate, or to remove it, as desired.

Generally, the length of the anchoring element should be less than the depth of the hole in the substrate, so that it is ultimately recessed within (below) the surface of the substrate, and the overall (aggregate) length of the insertion tool (300 or 310) and the anchor element should exceed the depth of the hole in the substrate, so that the end of the insertion tool is graspable.

In FIG. 3A it is shown that the insertion tool 310 can be marked or scored (as indicated by circumferential grooves 322) to serve two purposes: (1) to indicate the depth of embedment (how far the anchor element is below the surface of the substrate), and (2) to allow any portion of the insertion tool protruding from the surface of the substrate to be easily cut (or snapped) off. The insertion tool may be made of plastic or metal, and may be frangible.

Figure 4:
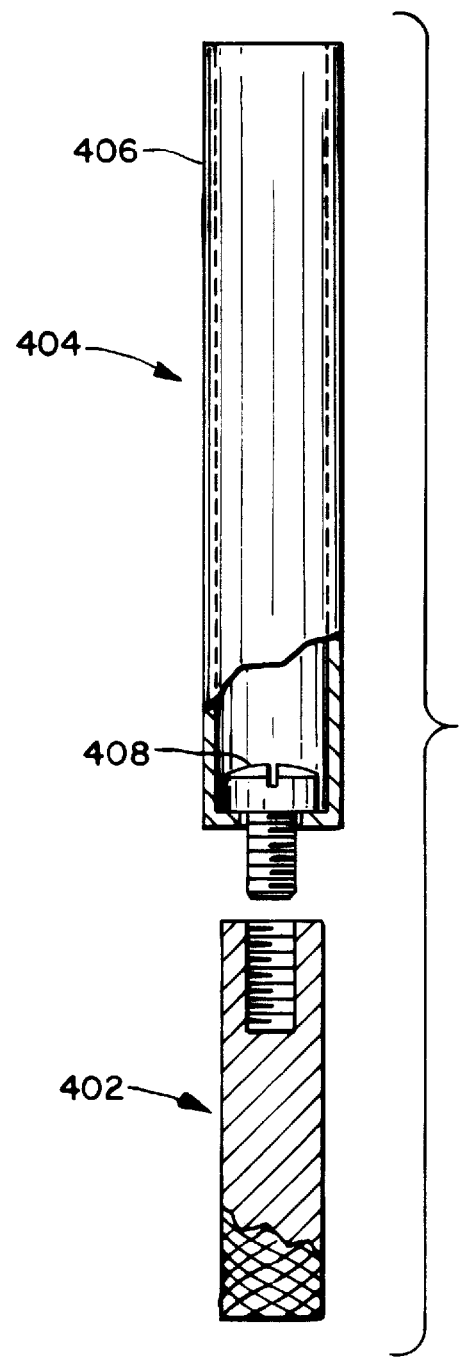
FIG. 4 is a side, partially cutaway view of an embodiment of the insertion tool of the present invention in conjunction with an embodiment of the anchor element of the present invention.

FIG. 4 shows an embodiment of the anchoring system 400 of the present invention. An anchor element 402 (similar to 200) is shown, and has the following exemplary dimensions:

length of 2";

outside diameter of ½";

bore diameter of ⅜";

internal thread of 16 tpi (threads per inch).

An insertion tool 404 (similar to 310) made of a suitable material, such as polycarbonate, is generally in the form of a hollow, cylindrical tube having the following exemplary dimensions:

length of 4";

outside diameter of ½"; and bore diameter of 0.390".

In use, the insertion tool 404 is assembled to the anchor element 402 by lining the two elements up coaxially, inserting a screwdriver (not shown) into the insertion tool, and screwing the protruding portion of the screw 408 into the anchor element. The assembled elements 402 and 404 are then inserted into a hole in a surface into which a suitable adhesive has been disposed. After the adhesive is set, the screw 408 be removed through the bore of the insertion tool, and the insertion tool can remain in place (in the hole in the substrate). To this end, the screw 408 is preferably of a ferrous material, so that it can be withdrawn through the bore with a magnetic screwdriver. Preferably, the insertion tool is sufficiently long to ensure that it protrudes beyond the surface of the hole, and the protruding portion of the insertion tool can then be cut off so that it is flush with the surface of the hole. Then, a bolt can be screwed into the anchor element 402, through the remaining (embedded) portion of the insertion tool 404.

Figure 4A:
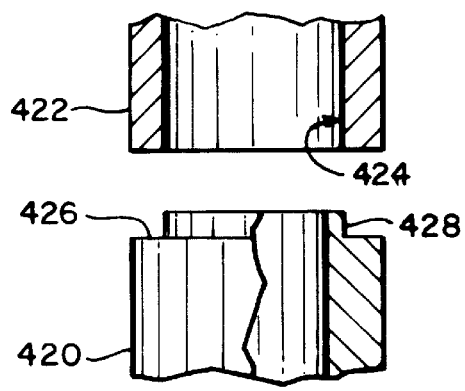
FIG. 4A is a side, partially cutaway view of an embodiment of an insertion tool of the present invention in conjunction with an embodiment of the anchor element of the present invention.

FIG. 4A shows an alternate arrangement of the engagement of the ends of an anchoring element 420 and an insertion tool 422, according to the invention. In this embodiment, the insertion tool 422 is a hollow tube (similar to 404), and has an inside diameter 424. The front (top) end 426 of the anchoring element is provided with an upwardlyextending (as viewed) lip 428, the outside diameter of which is such that the lip will seat within the inside surface 424 of the insertion tool 422. The inside surface of the lip should not interfere with the insertion of the end of a bolt into the sleeve 420.

Figure 4B:
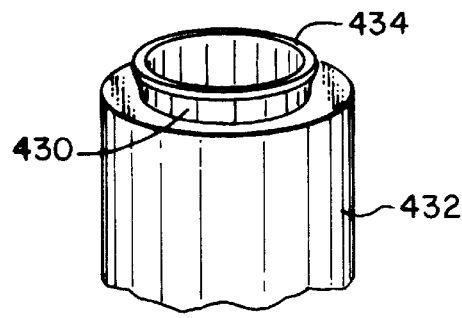
FIG. 4B is a perspective view of an end of an anchoring element, according to the present invention.

FIG. 4B shows an alternate arrangement for the end of the anchoring element. In this example, the lip 430 formed atop the anchoring element 432, for engagement with an end of an insertion tool (not shown), is formed with a region 434 of expanded diameter, to form a positive snap-fit with the end of an insertion tool.

Figure 5:
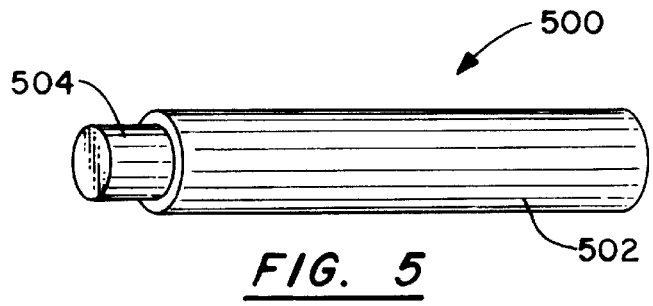
FIG. 5 is a perspective view of an alternate embodiment of the insertion tool of the present invention.

FIG. 5 shows an alternate embodiment of the insertion tool 500 of the present invention. In this embodiment, the insertion tool 500 is formed as a solid, generally cylindrical element having a main body portion 502 of a first diameter. At one end of the body portion 502, the insertion tool is necked down to form a projection 504 having a smaller diameter. The tool 500 is similar to the tool 300, except that is does not have a threaded end.

In use, the insertion tool is assembled to an anchor element by inserting the projection 504 into the internal threads of the anchor element. To this end, the projection 504 should form a resilient, interference fit with the bore of the anchor element.

An important advantage of the anchoring system of the present invention is that the bolt is removable (from the anchor element secured within the hole in the substrate), allowing for removal of any fixture bolted to the substrate, and leaving a flush surface on the substrate. If, for example, it is desired to remove the structural member (fixture), the substrate is left with a hole (assuming that the anchor element was recessed in the hole) which can be filled (e.g., with concrete patch material). Using traditional anchor studs, removing the fixture would result in a stud sticking up out of the hole, and the stud would need to be cut off in order to be flush with the surface—and once the stud were cut off, if would no longer be useable.

By using the anchoring system of the present invention, the fixture can be removed, the hole in the substrate can be filled, and the anchor element can be re-used simply by re-drilling the hole. Furthermore, the fixture can be replaced. Generally, in either case, the anchor element would remain in place to be reused.

Figure 6:
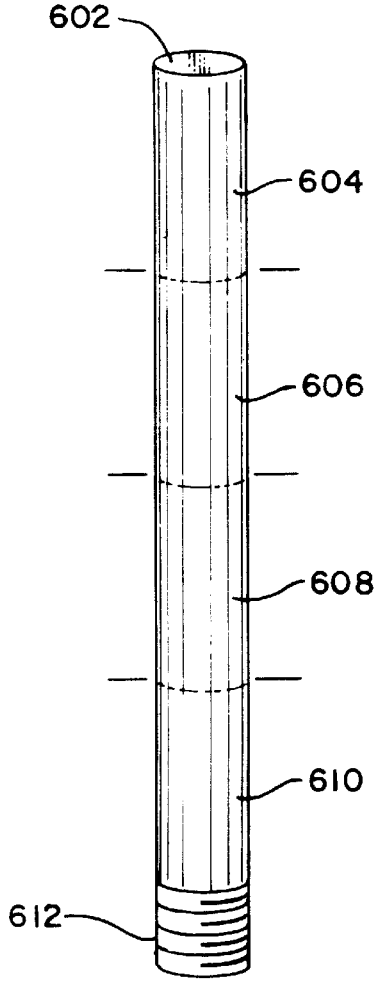
FIG. 6 is perspective view of an embodiment of a gauge element of the present invention.

FIG. 6 illustrates a gauge element 600 of the invention. As described hereinabove, the anchor element may be recessed to any depth (in the hole) below the surface of the substrate, and the hole can be filled (e.g., when a mounted fixture is removed). Then, at a later time, the hole in the substrate can be re-drilled to expose the anchor element (e.g., when a decision is made to remount the fixture to the substrate). In such a case, it is important to (1) avoid filling the internally-threaded hole in the anchor element, when dismounting the fixture and re-filling the hole in the substrate, and (2) ascertain how deep to drill (e.g., "core" drill) into the substrate to re-expose the anchor element.

The gauge element 600 is in the form of an elongated stick, and is suitably formed of a plastic material such as nylon. An elongated body portion 602 of the gauge element 600 has four portions (regions)—a first region 604, a second region 606, a third region 608 and a fourth region 610. Preferably, each of these regions are one inch long, making the body portion 602 four inches long, an is distinctively colored. For example: the first region 604 is colored red, the second region 606 is colored blue, the third region 608 is colored orange, and the fourth region 610 is colored white (which may be the "natural" color of the material forming the body portion 602). An end portion 612 of the gauge element 600 is threaded to thread into the anchor element, or is of an appropriate diameter to fit snugly within the internally-threaded bore of an anchor element (e.g., 102). The gauge element 600 is illustrated as having a constant outside diameter, which corresponds to the thread diameter of the anchor element (rather than to the outside diameter of the anchor element).

Figure 6A:
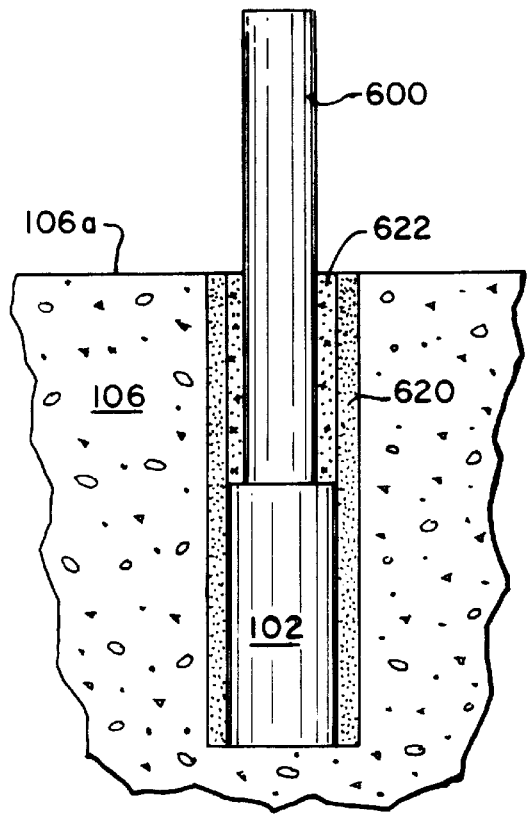
FIG. 6A is a cross-sectional view of the gauge element of the present invention, in use.

FIG. 6A illustrates use of the gauge element 600 of FIG. 6, in conjunction with an embedded anchor element 102 (compare FIG. 1). The substrate 106 has a hole, which is shown exaggerated in diameter for illustrative clarity. Adhesive 620 (as previously discussed, compare 108) secures the anchor element 102 in the hole in the substrate. The gauge element 600 is fitted into the anchor element (as shown), and the remaining (upper) portion of the hole is filled with a suitable fill (patch) material, e.g., grout) 622. A protruding portion of the gauge element 600 may then be excised (cut off) level with the surface 106a of the substrate. This will leave the excised end of the gauge element visible, as a guide to re-mounting a fixture to the substrate by inserting a bolt into the anchor element. The embedded portion of the gauge element which must be drilled to permit this is color-coded (as described above) as a guide to the user indicative of the depth to which the hole must be re-drilled. Alternatively, the gauge element can be excised (such as snapped off) so that the embedded portion is entirely below the surface 106a, in which case the fill material 622 can completely cover the embedded portion of the gauge element and conceal the fact that there is an anchor element embedded within the substrate.

Figure 6B:
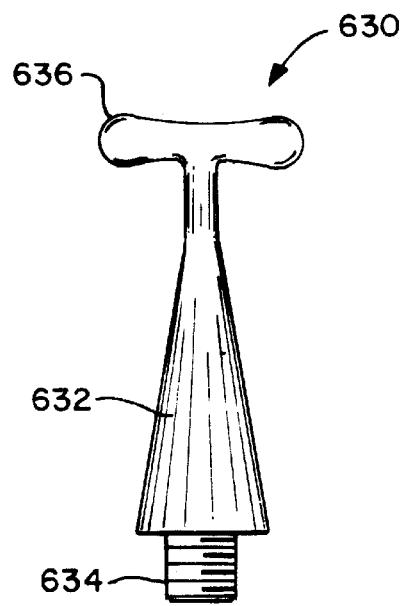
FIG. 6B is a side view of an alternate embodiment of the gauge element of the present invention.

The gauge element 630 may also be formed with a tapered (e.g., conical, or frustro-conical) body section 632, as shown in FIG. 6B. As noted hereinbefore, the anchoring element engaging end of the gauge element is suitably provided with threads 634, for threading into the front end of the anchoring element. The body section 632 tapers from a maximum diameter at the anchoring element engaging end, to a minimum at the (far) end that is intended to be grasped by the user. The far end is suitably provided with a thumb-screw type portion 636 to facilitate a user screwing the gauge element into an embedded anchoring element. An excess portion of the gauge element, extending above the surface of the substrate, can then be cut off. For example, if the gauge element is made of a plastic material, such as of nylon, a utility knife could be used to cut off the protruding portion (including thumb-screw portion) of the gauge element.

In the case of a tapered gauge element, the gauge element is threaded into the anchor element before grouting. Once the grout is cured, the protruding top portion of the gauge element is cut flush with the surface.

Due to the tapered shape of the body section of the gauge element, the diameter of the gauge element exposed at (flush with) the surface of the substrate will correspond to the depth of the anchor element within the substrate—the deeper the anchor element, the smaller the diameter of the gauge element at the surface of the substrate.

In order to later ascertain the depth of the anchor element, the diameter of the gauge element at the surface of the substrate is readily measured. However, it is also necessary to know the base diameter and taper angle of the cone to ascertain the depth of the anchor element. If, for a range of base diameters, such as all of the possible base diameters, the taper angle is the same, this simplifies matters (i.e., the taper angle will be known), leaving only the base diameter as a variable.

According to an aspect of the invention, gauge elements having different base diameters (e.g., for anchor elements of correspondingly different sizes/diameters) are formed of are formed of a different color material, such as colored plastic. For example, red gauge elements would have a different base diameter than blue gauge elements, and both would have a different diameter than a white gauge element. Although the math, at this point, is relatively straightforward, a color-coded template tool can be provided to the installer (e.g., with the anchoring kit) requiring the installer only to match up a circle of a given color with the cross-section of the gauge element visible at the surface of the substrate.

Figure 7:
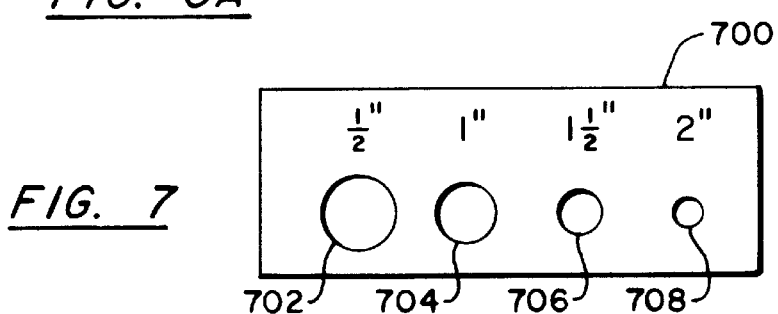
FIG. 7 is a plan view of a template for use with a gauge element, according to the present invention.

FIG. 7 shows a typical template 700 for ascertaining the depth of an embedded anchoring element that has been grouted over, according to the present invention. The template is suitably formed of any stiff material, such as plastic or metal, or may be more flexible and made of cardboard or paper.

The template is provided with a plurality of different-size holes. For example, a hole 702 is larger than a hole 704, which is larger than a hole 706, which is larger than a hole 708. Suitable legends are provided, adjacent the holes. For example, the large hole has the legend '½"', the hole 704 has the legend '1"', the hole 707 has the legend '1 ½"', and the small hole 708 has the legend '2"'. These are exemplary depths of embedment for an anchoring element, as determined by matching up the visible cross-section of the gauge element at the surface of the substrate with the holes on the template.

Figure 7A:
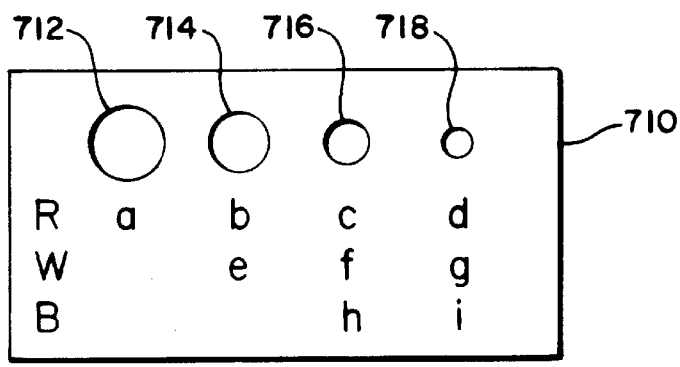
FIG. 7A is a plan view of an alternate embodiment of a template for use with the gauge element, according to the present invention.

As mentioned above, color-coded gauge elements can be provided for different diameter (size) anchoring elements. To this end, as shown in FIG. 7A, a template 710 (similar to the template 700) can be provided with a plurality of different size holes 712, 714, 716 and 718 (compare 702, 704, 706 and 708).

Three sets of legends can be provided, corresponding to three different color (size) gauge elements. For example, if the hole 718 matches the surface cross-section of a gauge element, the anchoring element is at a depth "d" if the gauge element is red, is at a depth "g" if the gauge element is white, and is at a depth "i" if the gauge element is blue.

The gauge element may also have a cylindrical body portion with a diameter corresponding to the outside diameter of the anchor element. This is especially useful for anchors having a small diameter, so that subsequent grouting is not necessary. Preferably, the diameter of the body portion of the gauge element is a few thousandths of an inch greater than the outside diameter of the anchor element so that it forms an interference fit within the hole in the substrate.

According to an aspect of the invention, the various components of the anchoring system can be provided as a kit, adapted in use for mounting a fixture to a substrate. For example, a kit would contain:

A. An anchor element of a given size (diameter). This component is required.

B. An insertion tool for inserting a given size anchor element into a hole in a substrate. For insertion tools left remaining in the hole (see, e.g., FIG. 3a), one per anchor element is required.

C. A drill bit for drilling the hole in the substrate. This component is optional (vis-a-vis the kit), since it is assumed that the installer has the necessary standard tools, and only one drill bit per several anchor elements would be required.

D. A quantity of adhesive for securing the anchor element within a hole in a substrate. The adhesive may be packaged separately, in a quantity that is suitable for securing a number of anchor elements. Or, as discussed above, the adhesive can be provided as a capsule (see, e.g., the text associated with FIG. 2c), one capsule per anchor element.

E. Optionally, a fastener for mounting the fixture to the substrate. It is assumed that the installer would select an appropriate fastener (head type, plating, etc.) for the particular application.

In a common chemical anchoring system, an externally-threaded stud is provided with a wedge-shaped tip for fracturing a capsule containing a two-part adhesive which is disposed in a hole in a substrate. Forming such a tip on threaded bar (rod) stock, or the like, is costly. An alternative is presented herein.

Figure 8A:
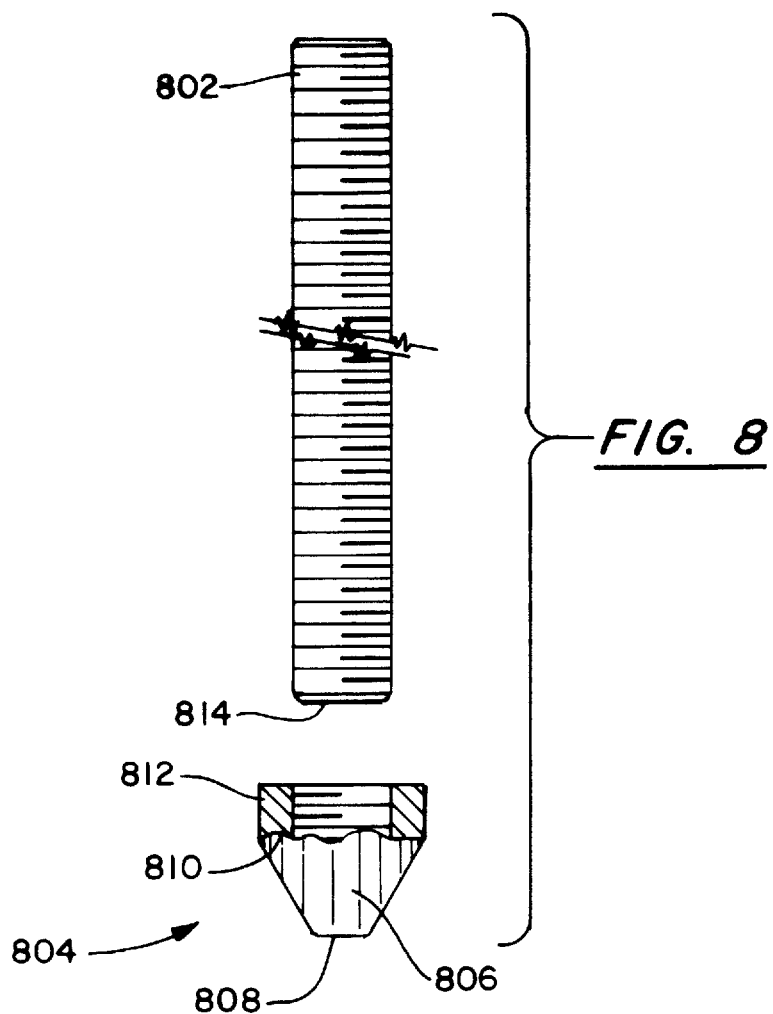
FIGS. 8A and 8B are alternate side and top views, respectively, of the wedge element of FIG. 8.
Figure 8A:
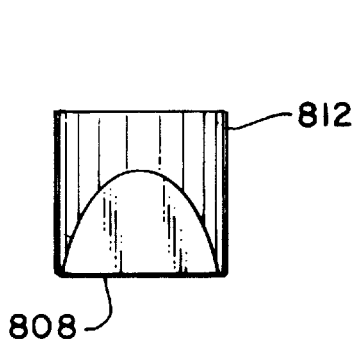

FIG. 8 shows an anchoring technique directed to having an externally-threaded stud protruding from the surface of a substrate, for mounting a fixture with a nut, and is intended for use with a chemical anchoring system (i.e., with a capsule containing a two-part adhesive).

An ordinary, externally-threaded rod (stud) 802 is cutoff from threaded bar stock (or unthreaded bar stock is cut, then threaded) to a desired length, which will include the embedded (in the hole in the substrate, not shown) length plus the length intended to protrude out of the hole in the substrate. Typically, there will be a reasonable amount of clearance between the outside diameter of the stud 802 (e.g., approximately ⅛ inch) to allow for the adhesive to "flow" around the external threads and secure the stud in the hole (i.e., in the substrate).

According to the invention, rather than forming a wedge (or chisel) point (tip) on the inserted end of the stud, a separate wedge element 804 is provided to effect a similar function (e.g., breaking the capsule and mixing the two-part adhesive).

Figure 8B:
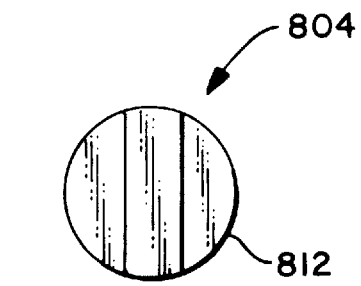

The wedge element 804 has a solid wedge-shaped body portion 806 with a narrow tip end 808 and a broad base region 810. An annular flange 812 extends from the base region 810 and, as shown, is provided with internal threads for screwing the wedge element onto the end 814 of the externally-threaded stud 802. Defining the view of the wedge element in FIG. 8 as a "front" view, a "side" view of the wedge element 804 is shown in FIG. 8A, and a top (towards the stud 802) view of the wedge element 804 is shown in FIG. 8B.

The above, and other objects, features, advantages and embodiments of the invention, including other (i.e., additional) embodiments of the techniques discussed above may become apparent to one having ordinary skill in the art to which this invention most nearly pertains, and such other and additional embodiments are deemed to be within the spirit and scope of the present invention.

What is claimed is:

1. Method of assembling a fixture to a substrate, comprising:

forming a hole in a substrate;

disposing adhesive into the hole;

disposing an internally-threaded anchor element into the hole, said anchor element having an end which is recessed below a surface of the substrate;

allowing the adhesive to secure the anchor element in the hole;

inserting an end of an elongate gauge element into the end of the anchor element;

removing the elongate gauge element;

positioning a fixture over the hole;

inserting a fastener through the fixture into the hole; and screwing the fastener into the anchor element.

2. Method, according to claim 1, further comprising:

using an insertion tool to dispose the internally-threaded anchor element into the hole; and allowing the insertion tool to remain in place while disposing the adhesive into the hole and allowing the adhesive to secure the anchor element in the hole.

3. Method, according to claim 1, further comprising subsequently:

removing the fastener;

then, removing the fixture;

then, re-positioning the same or another fixture over the hole;

then, re-inserting the fastener or another fastener through the re-positioned fixture or the other fixture into the hole; and then, re-screwing the fastener or the other fastener into the anchor element.

4. Method, according to claim 1, wherein:

the gauge element protrudes out of the surface of the substrate; and further comprising:

excising a portion of the elongate gauge element protruding out of the surface of the substrate.

5. Method, according to claim 1, further comprising:

removing the elongate gauge element by drilling.

6. Method, according to claim 5, further comprising:

drilling to a depth indicated by a visual characteristic of an exposed portion of the elongate gauge element.

7. Method, according to claim 6, wherein:

the visual characteristic is selected from the group consisting of color and cross-section visible at the surface of the substrate.

8. Method, according to claim 5, further comprising:

using a template to ascertain a depth of the recessed anchor below the surface of the substrate.

9. Method, according to claim 8, wherein:

the template has a plurality of different-size holes and legends adjacent each hole indicative of the depth of the anchor.

10. Method, according to claim 9, wherein:

the template has at least two sets of different-size holes, each set corresponding to a one of a plurality of elongate gauge elements, each having a distinct color.

* * * * *